OIL WELL PERMAFROST STABILIZATION SYSTEM

Original Filed Sept. 16, 1970

4 Sheets-Sheet 1

INVENTOR.
ELMER D. WATERS
BY
Clark N. Jew
- AGENT -

OIL WELL PERMAFROST STABILIZATION SYSTEM

Original Filed Sept. 16, 1970 4 Sheets-Sheet 3

INVENTOR.
ELMER D. WATERS
BY
Mark N. Jeu
-AGENT-

OIL WELL PERMAFROST STABILIZATION SYSTEM

Original Filed Sept. 16, 1970

INVENTOR.
ELMER D. WATERS
BY
Noble N. Jeu
- AGENT -

OIL WELL PERMAFROST STABILIZATION SYSTEM

Original Filed Sept. 16, 1970 4 Sheets-Sheet 4

INVENTOR.
ELMER D. WATERS
BY
Mark N. Jeu
-AGENT-

United States Patent Office

Re. 28,152
Reissued Sept. 10, 1974

28,152
OIL WELL PERMAFROST STABILIZATION SYSTEM

Elmer D. Waters, Richland, Wash., assignor to McDonnell Douglas Corporation

Original No. 3,749,163, dated July 31, 1973, Ser. No. 72,715, Sept. 16, 1970. Application for reissue Dec. 20, 1973, Ser. No. 426,809
Int. Cl. E21b *43/00, 43/24*
U.S. Cl. 166—57 25 Claims

Matter enclosed in heavy brackets [ ] appears in the original patent but forms no part of this reissue specification; matter printed in italics indicates the additions made by reissue.

ABSTRACT OF THE DISCLOSURE

Oil well casing construction for installation in permafrost to convey hot oil and simultaneously provide for permafrost stabilization. The oil well permafrost stabilization system normally includes an insulated heat gathering surface member or shield positioned around an upper predetermined length of production casing carrying hot oil through permafrost, passively actuated heat transfer tubes closed at their lower ends and thermally coupled to the heat gathering shield along its length, and a heat exchanger connected to the upper ends of the heat transfer tubes for rejecting the heat transferred thereto whereby heat from the hot oil carried by the production casing is prevented from melting the adjacent permafrost.

BACKGROUND OF THE INVENTION

My present invention relates generally to oil wells and more particularly to a well-casing construction which provides permafrost stabilization when used in such an environment.

Generally, in drilling an oil well, a string of surface or conductor pipe which is diametrically larger than the regular production casing is first installed a relatively short distance into the ground. The outside of the conductor pipe is bonded throughout its length by cement to the walls of the hole in which it is installed to provide a seal at the top portion of the well. After installation of blow-out prevention valves which permit the insertion of tools and equipment but which will prevent the escape of oil and gas, the well is drilled through the conductor pipe.

A string of diametrically smaller production casing is then installed inside the conductor pipe and extends from the surface of the ground to the bottom of the well. The production casing is cemented conventionally to provide a seal at the bottom portion of the well. In the event of leaks from the cement seal at the bottom of the well or breaks in the casing above the bottom cement seal, and a good seal is not provided at the top of the well, the uncontrolled escape of oil and gas outside the casing and conductor pipe can create a serious blow-out. The eruption under high pressure conditions would cover the surrounding area with oil and, if any sparks were produced by flying objects striking metal equipment or machinery, an oil well fire can be started and which could burn uncontrolled for weeks or months.

A producing oil well in areas such as the North Slope of Alaska will normally cause a severe problem of stress and starin in its well-casing and associated equipment above ground. This occurs because the oil is usually produced from depths below 8,000 feet where its temperature is nearly 200° F. When the hot oil is brought up through the well-casing, it melts the permafrost around the casing and, over an extended period of time, can turn the area around the well into a liquid slush. Such melting of the permafrost, which extends to depths of nearly 2,000 feet on the North Slope, will cause subsidence of the gravel well pad and its well-head machinery. In addition, the casing is left standing in mud with little support or sealing by such substance. Melting of the permafrost could also destroy the natural ice barriers that prevent water below the permafrost from reaching the surface and forming springs which would flow all year.

To prevent any damage to and resultant leaks from the production casing caused by ground subsidence due to melting of the permafrost, one method is based upon the belief that the downward movement of thawed permafrost ceases below about 100 to 200 feet. Provision for possible permafrost movements down to 500 feet is, however, usually made. In this system, a string of slip-joint casing which can telescope (shorten) in length when subjected to sufficient frictional down-drag loads is installed outside of the production casing but inside of the conductor pipe. An extensible well-head is installed at the top of the slip-joint casing which extends down to about 700 feet, for example. Special silip joints are installed in the top 500 feet of the slip-joint casing and which is exposed to the anticipated zone of subsidence, and the lower 200 feet is cemented to the ground formation.

As subsidence begins, the melted permafrost fills the annular space between the original hole and the slip-joint casing. A subsidence continues, the thawed sand and gravel move down and the frictional drag on the slip-joint casing increases until a slip joint shear bar is sheared to allow the casing above the release slip joint to move down until the frictional force has been relieved. The slip joint is designed to telescope together (or apart) to permit shortening (or lengthening) of a maximum of 10 feet, for example. Thus, the slip-joint casing effectively shields and isolates the production casing from the subsiding permafrost. The extensible well-head is periodically extended (raised) against the relatively slow downward movement of of the slip-joint casing above the released slip joint. The production casing can be maintained at a constant elevation by the use of screw jacks which are similarly adjusted as the ground sinks. However, over a period of years, gravel must be added to the well pad which may eventually become 15 to 20 feet thick.

Another method of solving the problem of melting permafrost is to install two extra concentric strings of casing extending through the permafrost layer outside of the production casing but inside of the conductor pipe, and circulating a cold liquid down between the extra casing strings and back up between the inner extra casing and the production casing to maintain the frozen condition of the adjacent permafrost during the oil producing phase. The inner production casing is, of course, suitably insulated from the cold liquid being circulated outside it. It should be noted that there are normally other casings and/or sleeves within each of the slip-joint and refrigeration well-casing constructions described above but which need not be discussed in this simplified explanation.

In the refrigeration method, if the permafrost can be kept frozen, it will seal and support the conventionally cemented casing to preclude any oil or gas leakage which could lead to a blow-out. With hot oil flowing continually through the inner production casing, however, there is no way without refrigeration even with double or triple casings that the outer casing can be insulated with conventional techniques to prevent melting of the permafrost for the life of the well. The present refrigeration methods are embodied in active systems employing compressors and involve the forced circulation of a coolant. This equipment is very bulky and expensive, and there are many problems associated with power supply, operation and maintenance of such equipment in the artic regions.

SUMMARY OF THE INVENTION

Briefly, and in general terms, my invention is preferably accomplished by providing an oil well permafrost stabilization system including a well-casing construction which can be installed to convey hot oil through permafrost and simultaneously transfer heat from the hot flowing oil passively to a heat exchanger so that the permafrost adjacent to the well-casing remains frozen. The well-casing construction preferably includes a string of production casing having an insulated heat gathering surface member or shield or longitudinally spaced surface member or shield sections positioned concentrically around an upper predetermined length of the production casing which carries hot oil through the permafrost, and passively actuated heat transfer tubes (heat pipes) closed at their lower ends and thermally coupled longitudinally to the heat gathering shield or spaced shield sections. The open upper ends of the heat transfer tubes are suitably connected to the heat exchanger which rejects heat transferred thereto.

The heat exchanger is preferably a passive device such as a heat rejection radiator exposed directly to the atmosphere. In certain instances, however, when power is available near the well, a blower can be suitably incorporated with the passive radiator to convert it into an active [forceddraft] *forced-draft* radiator whenever the blower is energized. Similarly, the cooling element of an active refrigeration system can be suitably coupled thermally or incorporated into the passive radiator, or the passive radiator structure can be appropriately modified (as by adding coolant passageways therein) to serve also as the refrigeration cooling element. The refrigeration system can, for example, be operated only for certain portions of the year when required. Of course, the blower noted above can be used jointly with a refrigeration system, if desired.

The heat gathering shield (or longitudinally spaced shield sections) is preferably sandwiched between two layers of insulation, and the heat transfer tubes attached directly to the shield (or shield sections) so that they are also sandwiched between the insulation layers. It was mentioned previously in the background discussion that in certain [wellcasing] *well-casing* constructions, there are actually other casings and/or sleeves suitably positioned within both the conductor pipe and production casing. With such well-casing constructions, and under certain conditions, a casing or sleeve outside of the production casing can serve as the heat shield. The heat transfer tubes can be suitably attached (welded) longitudinally to such a heat shield and the insulation layers can be installed individually in the annular spaces separating the heat shield from the production casing and an outer casing. Also, an alternative form of the heat gathering shield and attached transfer tubes utilizes two concentric strings of casings having appropriate thickness walls which are closed or joined together at a predetermined distance from their open upper ends. The walls of these casings comprise a heat gathering surface member or shield and the closed casings form a heat transfer tube, the open upper end of which is suitably connected to a heat exchanger. This form of heat transfer tube (heat pipe) is, of course, properly insulated and filled with a suitable working fluid.

Of significance, the permafrost stabilization heat transfer system is a unidirectional device which does not transfer heat from the air into the well and permafrost, no matter how high the air temperature rises. Gravity continually drains condensate away from the radiator and down the inside surfaces of the heat transfer tubes. There is no mechanism for resupply of working fluid (liquid) to the radiator region to allow it to operate as a boiler of the heat transfer tubes. Thus, heat can be transmitted down the well only by conduction along the walls of the heat transfer tubes and this amount is negligible.

BRIEF DESCRIPTION OF THE DRAWINGS

My invention will be more fully understood, and other features and advantages thereof will become apparent, from the following description of certain exemplary embodiments of the invention. The description is to be taken in conjunction with the accompanying drawings, in which.

*DESCRIPTION OF THE PRESENT EMBODIMENTS*

Figure 1:
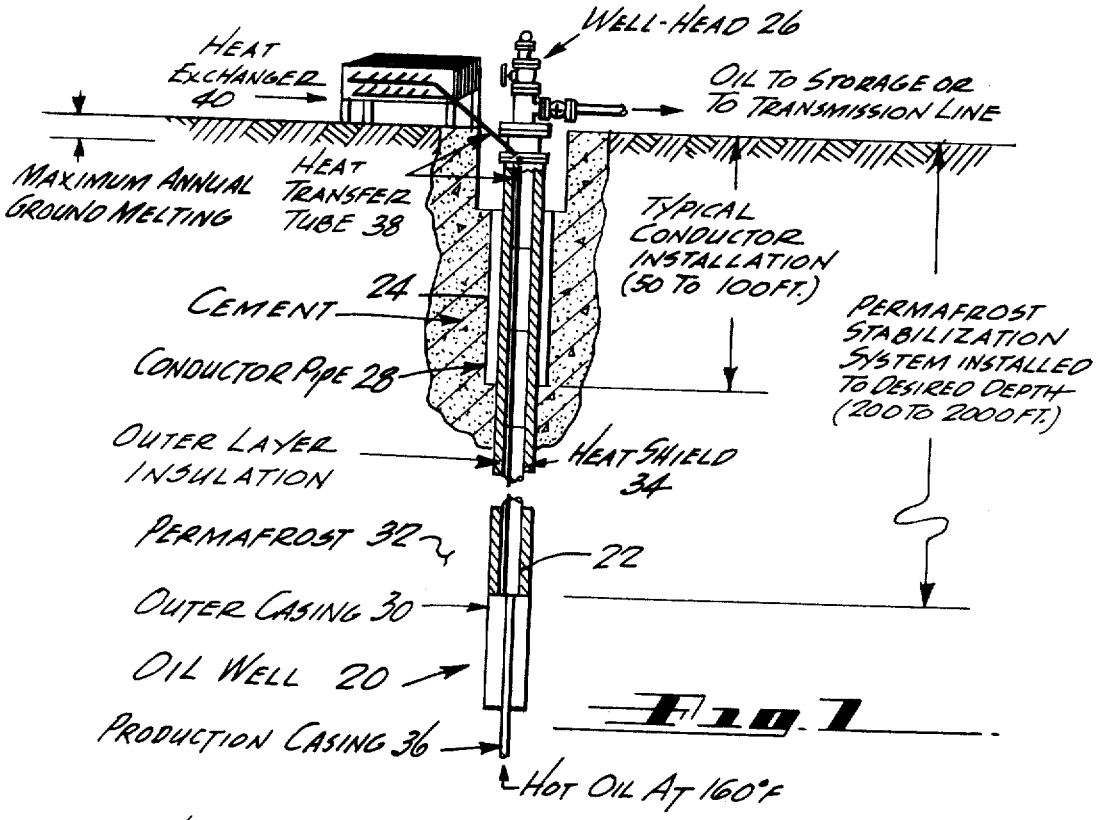
FIG. 1 is a fragmentary and generally sectional view, shown partially in perspective, of an oil well permafrost stabilization system according to this invention.

FIG. 1 is a fragmentary and generally sectional view, shown partially in perspective, of an oil well 20 including a permafrost stabilization system 22 in accordance with my invention. The oil well 20 includes a well-casing construction 24 having a well-head 26 delivering oil to a storage tank or a transmission line. The well-casing construction 24 includes a regular conductor pipe 28 which is conventionally cemented to provide the usual seal at the top portion of the well 20. An outer casing 30 which can be termed a surface casing, in this instance, extends through permafrost 32 and is kept cold by the stabilization system 22.

The permafrost stabilization system 22 includes a fully insulated heat gathering surface member or shield 34 located within the outer casing 30 and positioned concentrically around an upper predetermined length of the production casing 36 conveying hot oil at about 160° F. through it. The heat shield 34 (not shown in section) is thermally coupled to a passively actuated heat transfer tube 38 (heat pipe) which is closed at its lower end and connected at its open upper end to a heat exchanger 40. The heat flowing from the hot oil (being conveyed by the production casing 36) towards the permafrost 32 is gathered by the heat shield 34 and transmitted by the heat transfer tube 38 to the above-ground heat exchanger 40 where it is rejected to the ambient air. The system 22 operates continuously and the heat exchanger 40 can be a fully passive device such as a heat rejection radiator exposed directly to the atmosphere. As noted in an earlier section, the heat exchanger 40 can be a fully active device instead of a passive one, or it can be a partially active one which is made active only for certain months of a year, for example.

Figure 2:
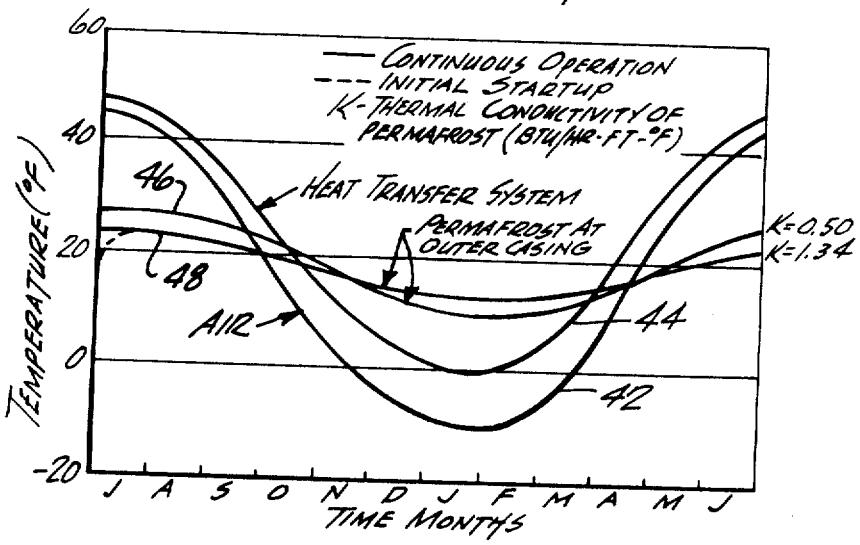
FIG. 2 is a graph including temperature versus time curves which illustrate the general operation and performance of the system shown in FIG. 1 used in an oil well located at a selected geographic permafrost region.

FIG. 2 is a graph including temperature versus time curves which illustrate the general operation and performance of the system 22 shown in FIG. 1 used in an oil well 20 located at a geographic permafrost region (Barrow, Alaska) having the annual average maximum air temperature indicated by curve 42. The stabilization or heat transfer system 22 or, more specifically, the vapor within the heat pipe 38 has a temperature variation as indicated by curve 44. The normal vapor-filled heat pipe 38 has a vapor temperature which is substantially constant throughout its length. The temperature of the permafrost 32 next to the outer casing 30 is depicted by curves 46 and 48.

The temperature curve 46 is that of permafrost 32 which is mostly soil and, therefore, as a thermal conductivity K equal to about 0.50 whereas the temperature curve 48 is that of permafrost which is mostly ice and has a thermal conductivity K equal to about 1.34. Initial start-up of the well 20 in pumping hot oil produces a rise in permafrost temperature as indicated by the broken line portion joining with the curve 48. It can be seen that the permafrost 32 would not melt even where production began during the warmest month (July) of the year. After a short period of operation, the system 22 reaches a quasi [steady state] *steady-state* condition which results in only a small cyclic variation in annual permafrost temperature.

The general operation and performance of the heat transfer or permafrost stabilization system 22, as illustrated in FIG. 2, was obtained from computer runs on the system in which well-casing construction 24 includes a standard 20-inch (outside diameter) steel outer casing 30 with a ½-inch thick wall and a similar 10⅝-inch (outside diameter) inner or production casing 36 with a ½-inch thick wall, for example. A total of about 2 inches was allowed for extra spacing to prevent interference between the insulated heat shield 34 and heat pipe 38 assembly and the outer and inner casings during installation into the well 20; that is, the heat shield (and its thermally coupled heat pipe) was encased between insulation layers having a total thickness of approximately 3 inches. Of course, conservative values of air temperatures (curve 42) and thermal properties of the permafrost 32 were used in the computer runs. Thus, the use of average maximum air temperatures in the calculations is very conservative since average mean air temperatures are 5° to 7° F. colder. Likewise, the calculations omitted certain other factors which would cause the permafrost temperatures to be even lower than that shown in FIG. 2.

Figure 3:
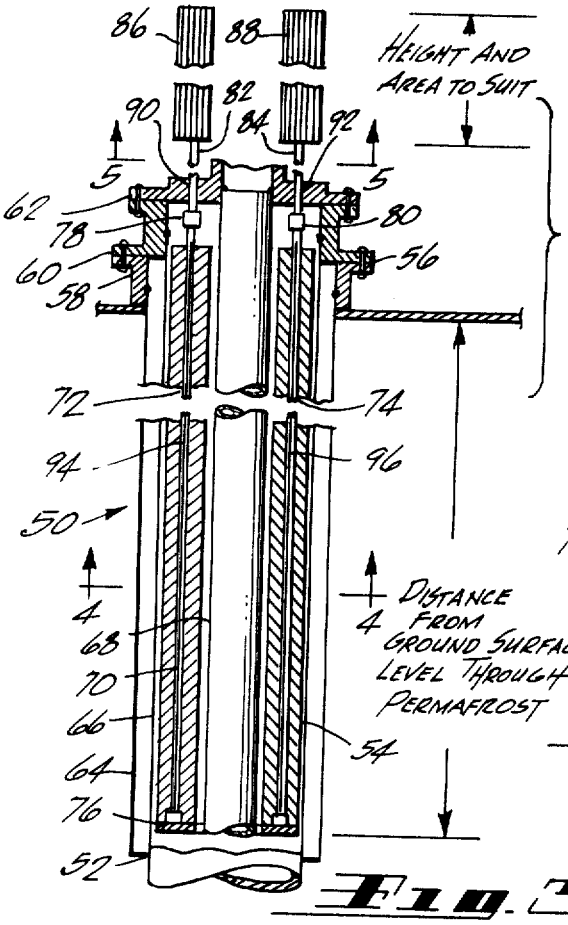
FIG. 3 is a fragmentary sectional view of another oil well permafrost stabilization system constructed according to this invention.

FIG. 3 is a fragmentary sectional view of another oil well 50 including a well-casing construction 52 and a permafrost stabilization system 54 according to this invention. The well-casing 52 has a well-head 56 including casing-head sections 58, 60 and 62. The cylindrical lower section 58 is connected to the upper end of casing 64 which is located within a larger concentric conductor pipe (not shown). The upper flange of the lower section 58 is secured to the lower flange of the cylindrical middle section 60 which is connected to the upper end of an outer casing 66 that is kept cold by the stabilization or heat transfer system 54. The upper flange of the middle section 60 is, in turn, secured to the lower flange of the generally cylindrical upper section 62 which is connected to the upper end of an inner production casing 68 conveying hot oil through it.

The permafrost stabilization system 54 includes an insulated heat gathering shield 70 located within the outer casing 66 and positioned concentrically around an upper predetermined length of the production casing 68. The heat shield 70 is directly coupled to passively actuated heat transfer tubes 72 and 74 (heat pipes) which are closed at their lower ends and supported, for example, by a plate 76 affixed to the production casing 68. The open upper ends of the heat pipes 72 and 74 are joined by respective couplings 78 and 80 to the lower ends of tubes 82 and 84 connecting with passive heat exchangers or radiators 86 and 88. The tubes 82 and 84 are shown as passing through holes 90 and 92 in the flange of the casing-head upper section 62. Actually, however, the holes 90 and 92 are preferably passageways which are bored through the flange of the upper section 62 at appropriate angles and with suitable curvatures. The lower ends of the bored passageways are suitably adapted (threaded or countersunk) to connect with or be welded to the upper ends of short tubes having the couplings 78 and 80 at their lower ends. Similarly, the upper ends of the bored passageways are suitably adapted to connect with the lower ends of the radiator tubes 82 and 84.

Figure 4:
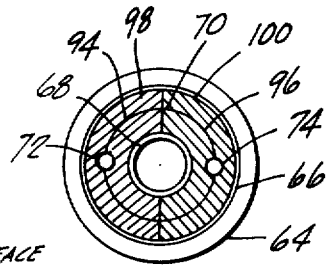
FIG. 4 is a cross sectional view of the stabilization system construction as taken along the line 4—4 indicated in FIG. 3.

FIG. 4 is a cross sectional view of the permafrost stabilization system structure as taken along the line 4—4 indicated in FIG. 3. The insulated heat shield 70 can comprise two diametrical tubular halves 94 and 96 of sheet metal directly connected longitudinally to the heat pipes 72 and 74, respectively. The heat pipe 72 and heat shield half 94 are embedded in an insulation section 98, and the heat pipe 74 and heat shield half 96 are embedded in another insulation section 100. Corresponding diametrical ends of the heat shield halves 94 and 96 are preferably joined in closed longitudinal contact to avoid leaving any gaps in the heat shield 70. The insulation material used is preferably closed cell urethane foam.

Figure 5:
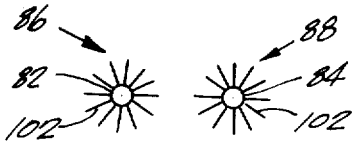
FIG. 5 is another cross sectional view of the stabilization system construction as taken along the line 5—5 indicated in FIG. 3.

FIG. 5 is another cross sectional view of the permafrost stabilization system structure as taken along the line 5—5 indicated in FIG. 3. The radiator tubes 82 and 84 are, of course, the cooler condenser part of the heat pipes 72 and 74 extending above ground into the open air. Radial fins 102 of suitable height and area can be affixed longitudinally to the tubes 82 and 84 to reject heat into the atmosphere. The working fluid in the heat pipes 72 and 74 is vaporized by the heat collected by the heat shield 70 from the hot oil in the production casing 68. This vapor is condensed in the cooler radiator tubes 82 and 84, and flows back down the walls of the radiator tubes and their respectively connected heat pipes 72 and 74 to repeat the cycle. Thus, heat from the hot oil is transported to the radiators 86 and 88 where it is rejected to the atmosphere. The outer casing 66 will, therefore, be kept cold and not melt its adjacent permafrost. It should be noted that, in this embodiment, the heat pipes 72 and 74, and their respectively connected radiator tubes 82 and 84, are of relatively small diameter and do not have (in most instances) the usual internal wall screen wick used in conventional heat pipes.

Figure 6:
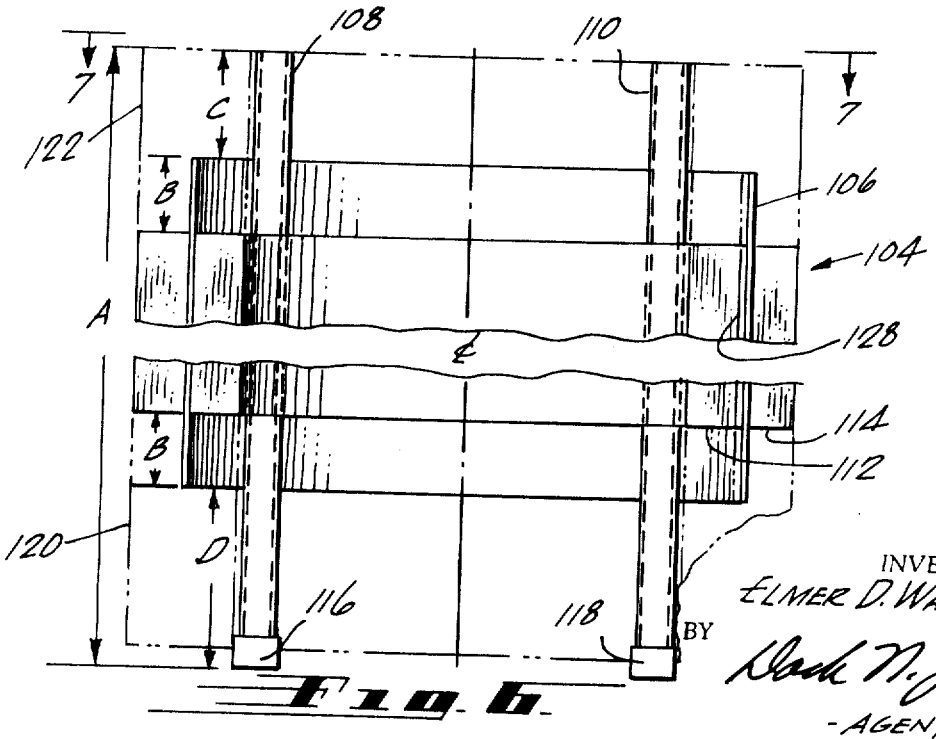
FIG. 6 is a fragmentary elevational view of an insulated structure including a diametrical half of a longitudinal heat gathering shield section with directly coupled sections of heat transfer tubes.

FIG. 6 is a fragmentary elevational view of an insulated structure 104 including a diametrical half of a longitudinal heat gathering shield section 106 having directly coupled sections 108 and 110 of heat transfer tubes (heat pipes). The heat shield section half 106 and its heat pipe sections 108 and 110 are longitudinally embedded except at their upper and lower ends with radially inner and outer layers 112 and 114 of insulation. The normally lower ends of the tube sections 108 and 110 are provided with respective couplings 116 and 118. This insulated structure 104 can be used in either of the well-casing constructions 24 or 52 shown in FIGS. 1 or 3. A tubular assembly is formed from a pair of the insulated structures 104 installed about a length of the production casing 36 (FIG. 1) or 68 (FIG. 3). Other similar tubular assemblies are provided about successive lengths of a production casing and connected together by the couplings 116 and 118 of each assembly.

The total number of tubular assemblies used is that required to extend from ground [from ground] level down to the desired depth over which permafrost stabilization is necessary or to be provided. The couplings 116 and 118 of the last or lowest [tublar] *tubular* assembly are of course, sealed and the longitudinal insulation gaps of the ends of each tubular assembly are filled by suitably shaped insulation sections 120 and 122. These filler sections 120 and 122 are indicated in phantom lines and can be appropriately formed of radially inner and outer layers of insulation to embed fully the exposed lower and upper ends of a pair of the insulated structures 104.

It is noted that the heat shield sections 106 do not form a longitudinally continuous heat shield; however, the gap between successive heat shield sections is relatively small compared to the length of a heat shield section.

The insulated structure 104 has an overall length A as indicated in FIG. 6. The heat shield section half 106 extends beyond the normally lower and upper surfaces of the insulation layers 112 and 114 by a distance B. The upper ends of the heat pipe sections 108 and 110 extend, in turn, a distance C above the upper edge of the heat shield section half 106. Similarly, the lower ends of the heat pipe sections 108 and 110 including their respectively connected couplings 116 and 118 extend a distance D below the lower edge of the heat shield section half 106. The insulation layers 112 and 114 are, for example, made of closed cell urethane foam weighing about 3 lb./cu. ft. The heat shield section half 106 can be fabricated or type 6061–T4 sheet aluminum of approximately ⅛-inch thickness. Each of the heat pipe sections 108 and 110 can be made from a type 6061–T4 aluminum tube having a 1 inch outside diameter and 0.083 inch thick wall. The couplings 116 and 118 can also be made of aluminum and are suitably welded or threaded onto the ends of the heat pipe sections 108 and 110. Each of the couplings 116 and 118 can be, for example, 1 inch long with a 1 inch inside diameter and 0.083 inch thick wall.

Figure 7:
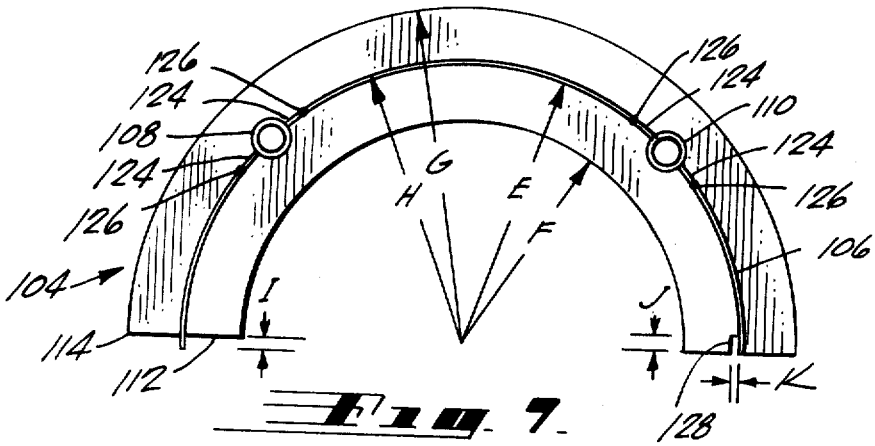
FIG. 7 is a top plan view of the insulated structure as taken along the line 7—7 indicated in FIG. 6.

FIG. 7 is a top plan view of the insulated structure 104 as taken along the line 7—7 indicated in FIG. 6. Each of the heat pipe sections 108 and 110 is preferably extruded as a tube with wing-like flanges 124 extending diametrically therefrom. These flanges 124 are welded by full length fusion welds 126 to the heat shield aluminum sheets before forming into the circular shape shown. The insulation layers 112 and 114 can be bonded to the surfaces of the heat shield section half 106 and its welded heat pipe sections 108 and 110 with a suitable adhesive. The inner layer 112 has an outer radius E and an inner radius F, and the outer layer 114 has an outer radius G and an inner radius H.

The left end of the heat shield section half 106 protrudes a distance I beyond the left end surfaces of the layers 112 and 114. A longitudinal slot 128 of depth J and width K is provided in the right end of the insulated structure 104 to accommodate the protruding end of a similar insulated structure. One side of the slot 128 is formed by the radially inner exposed surface portion of the right end of the heat shield section half 106. Thus, good thermal contacts between two heat shield section halves 106 are obtained by using junctions with overlapping ends of the heat shield section halves. These thermal contacts may be desirable but are not necessary, however. The overlapping joints are mainly for structural rigidity and prevention of any thermal leak.

The insulated structure 104 can, of course, be used in the well-casing construction 24 shown in FIG. 1. A suitable number of pairs of the insulated structure 104 together with the necessary filler insulation sections 120 and 122 can be installed between the production and outer casings 36 and 30. This forms an insulated assembly of a number of heat shield sections with four thermally coupled heat pipes, for example. It is, of course, preferable that each heat pipe be connected independently to its own heat exchanger. Illustrative dimensions for the insulated structure 104 shown in FIGS. 6 and 7 are as follows: A=20 feet, B=2 inches, C=3 inches, D=5 inches, E=7½ inches, F=5 13/16 inches, G=9 1/16 inches, H=7⅝ inches, I=one-half inch, J=one-half inch and K=one-eighth inch. It is, of course, to be understood that the types of materials and specific dimensions noted herein are merely given by way of example only, and are not to be construed as limiting on the invention in any manner.

The heat pipe sections 108 and 110 (extruded tubes) are hydrostatically tested, to, for example, 500 p.s.i.g., halogen leak tested, internally cleaned with Freon or ammonia according to which is used as the working fluid, and dried and sealed with plastic caps until ready for installation. After a suitable number of pairs of the insulated structure 104 is installed and coupled together in the oil well 20, and the resultant four heat pipes are connected to respective radiators or heat exchangers, the four heat pipes are conventionally evacuated and loaded with working fluid through suitable valve connections. A predetermined amount of working fluid is transferred into each heat pipe from a metered volume tank. Freon is preferred as the working fluid because it is slightly less corrosive than other suitable fluids such as ammonia, propane, or other member of the alkane family, etc. Ammonia is more efficient, however, and may be preferred in certain instances.

Figure 8:
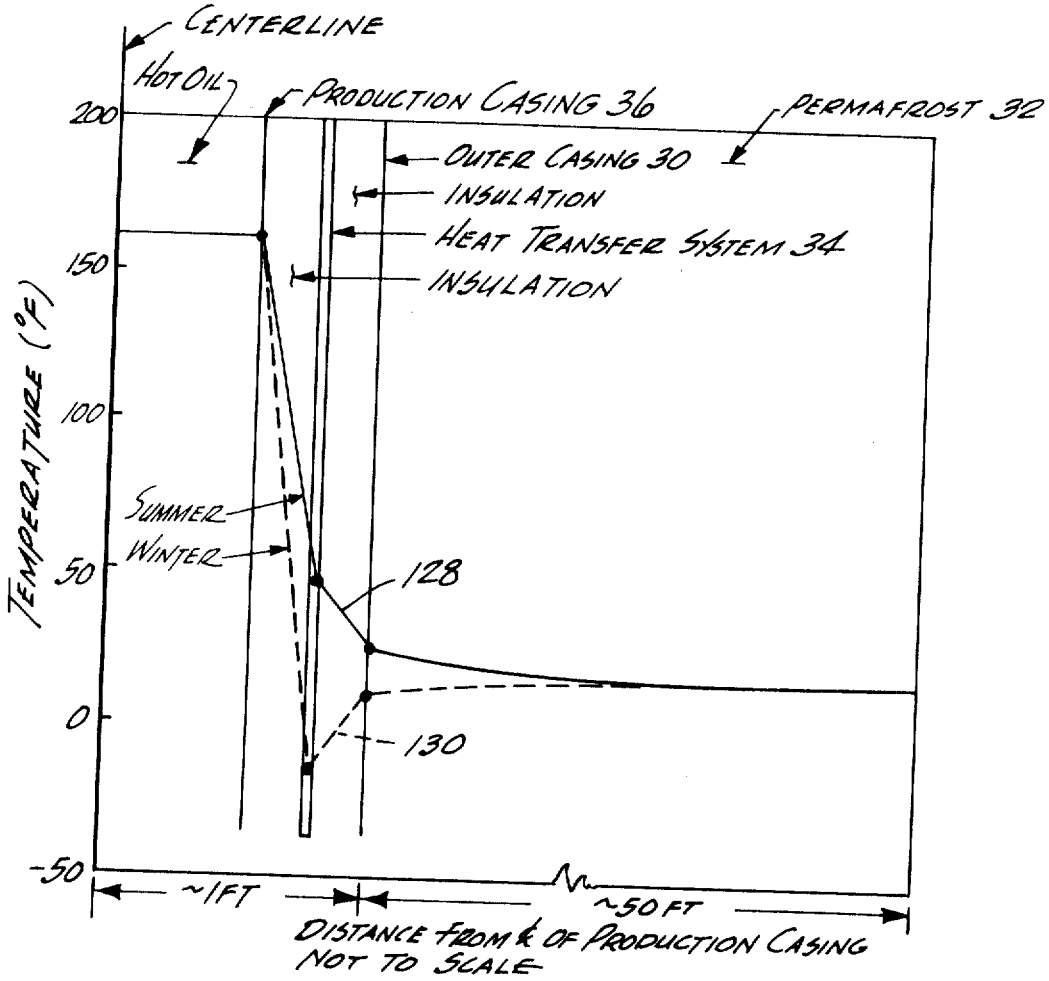
FIG. 8 is a graph including curves which are plots of temperature versus distance from the centerline of the production casing, illustrating the temperature gradients for summer and winter operation of the stabilization system shown in FIG. 1.

FIG. 8 is a graph including curves 128 and 130 which are plots of temperature versus distance from the centerline of the production casing 36, illustrating the temperature gradients for summer and winter operation of the well-casing construction 24 of FIG. 1 utilizing a suitable number of the insulated structure 104 of FIGS. 6 and 7 in its permafrost stabilization system. The stabilization system operates continuously and very efficiently. In summer, when air temperatures are relatively high, the system rejects some heat to the air and reduces heat flow to the permafrost 32 to a very low value. This is illustrated by the curve 128. In winter, when air temperatures are low, the system is so efficient that its heat gathering shield operates at temperatures much below the permafrost temperature and actually cools the permafrost 32 below its normal 14° to 17° F. temperature. This is illustrated by the curve 130.

Figure 9:
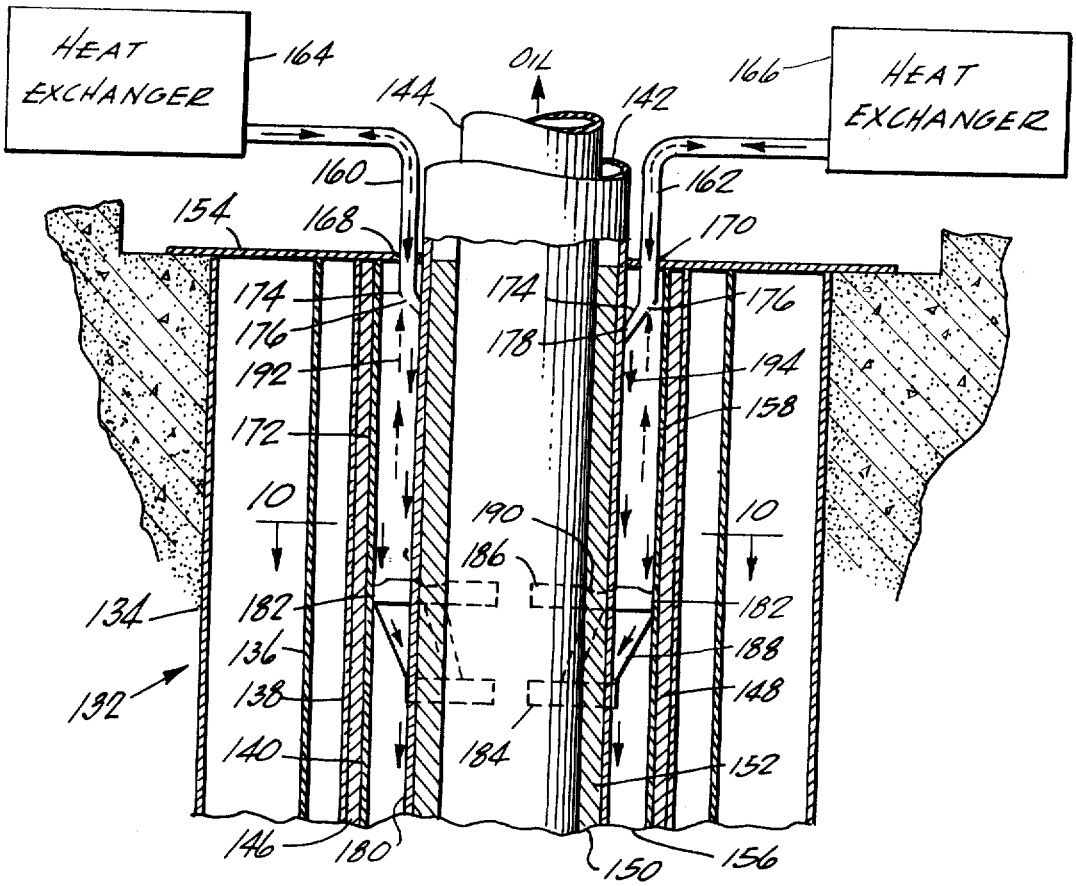
FIG. 9 is a fragmentary and generally sectional view, shown partly in simplified and diagrammatic form, of another embodiment of this invention.

FIG. 9 is a fragmentary and generally sectional view, shown partly in simplified and diagrammatic form, of another embodiment of this invention. In this embodiment, advantage is taken of a well-casing construction 132 which is based upon the use or availability of standard or ordinary casings therein. The well-casing construction 132 includes a regular 30-inch conductor pipe 134, a 20-inch surface casing 136, a 16-inch outer casing 138, a 13⅜-inch intermediate casing 140, a 9⅝-inch completion casing 142 and a 7-inch production casing 144. The annular space 146 between the outer and intermediate casings 138 and 140 is suitably closed or sealed as by a packer element or cement at approximately 2,000 feet, for example, and a layer 148 of insulation is installed in the space from ground level down to about 2,000 feet. The annular space 150 between the completion and production casings 142 and 144 is similarly closed by a packer element at approximately 2,000 feet, and another layer 152 of insulation is installed in the space from ground level down to about 2,000 feet.

The upper end of the conductor pipe 134 terminates at a cellar floor base plate 154. The upper ends of the surface, outer and intermediate casings 136, 138 and 140 are also shown in FIG. 9 as terminating at the base plate 154. Actually, of course, the upper ends of the casings 136, 138 and 140 are terminated at respective casinghead sections or spools of the well-head in a manner similar to that of FIG. 3. The base plate 154 is a simplified but functionally correct representation of the casinghead structure for the intended purposes of this description. The annular space 156 between the intermediate and completion casings 140 and 142 is suitably closed and sealed at, for example, approximately 2,000 feet to form an annular heat pipe 158 which is connected at its upper end by tubes 160 and 162 to respective heat exchangers 164 and 166. The radially inner portion of the base plate 154 closes and seals the upper end of the annular space 156, and the tubes 160 and 162 extend into the annular space through holes 168 and 170, respectively. The intermediate and completion casings 140 and 142 forming the annular heat pipe 158 comprise a heat gathering surface member or shield 172 which is insulated by the insulation layers 146 and 150.

Four (or more) equally spaced tubes with respective heat exchangers are preferably used with the annular heat pipe 158; however, only one heat exchanger and tube connecting with a manifold covering the entire top opening of the annular heat pipe is also satisfactory. Each of the tubes 160 and 162 is preferably terminated with a nozzle 174 at its lower end. The nozzle 174 has an upper vapor opening 176 and a lower liquid opening 178. The axis of vapor opening 176 is generally aligned with the vertical direction of the annular space 156, and the plane of the liquid opening 178 is located adjacent to and generally parallel with the vertical outer surface of the completion casing 142. An isotropic wick 180 which can be, for example, a type 316SS, 20-mesh x 0.016 inch diameter wire screen is provided on the outer surface of the casing 142 over its entire length in the annular heat pipe 158. The liquid opening 178 of each nozzle 174 is positioned against the wick 180. It is preferable that an isotropic wick be installed against the outer surface of the completion casing 142 than against the inner surface of the intermediate casing 140. The heat exchanger tubes 160 and 162 do not contain any type of wick in them.

Liquid collection and transfer brackets 182 are preferably used in the annual heat pipe 158. These brackets 182 serve to collect any condensate liquid which may be flowing down the inner surface of the intermediate casing 140 instead of down the wick 180 as directed by the liquid opening 178 in each nozzle 174. A set of brackets 182 can be provided at predetermined spacings along the length of the heat pipe 158. The spacing between the sets can be, for example, 10 feet or the spacing can be varied so that it is less in the upper part of the heat pipe. 158. Each bracket 182 generally includes a semicircular lower flange 184 and a semicircular upper flange 186 connected to the lower flange by outwardly flaring strips 188. The upper edge of the upper flange 186 is preferably scalloped to provide arcuate recesses 190 centered above respective strips 188 to direct the flow of liquid towards the strips and, hence, to the wick 180.

Figure 10:
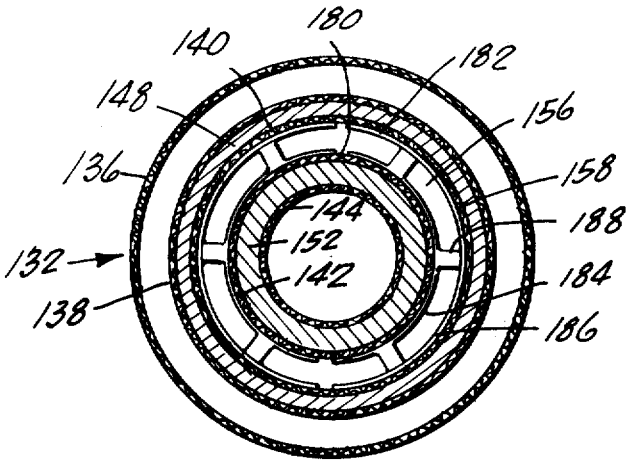
FIG. 10 is a cross sectional view of the oil well permafrost stabilization system construction as taken along the line 10—10 indicated in FIG. 9.

FIG. 10 is a cross sectional view of the well-casing construction 132 as taken along the line 10—10 indicated in FIG. 9. The lower flange 184 of the bracket 182 can be spot welded at a few points along the lower flange to the completion casing 142 through the wick 180. As each longitudinal section of the completion casing 142 string is installed in the intermediate casing 140 string, the upper flanges 186 of each set of the brackets 182 are deflected inwardly on the strips 188 and are maintained in spring-loaded contact against the inner surface of the intermediate casing. It is noted that as each section of the completion casing 142 string is coupled to a preceding section and installed, the ends of the wick 180 on the successive sections can be placed and/or suitably secured in good and firm abuting contact.

Operation of the stabilization system of FIGS. 9 and 10 is simple and automatic. After a regular loading of the annular heat pipe 158 with ammonia or other suitable working fluid, the system automatically operates continuously and efficiently when hot oil is pumped up through the production casing 144. In the loading process for this embodiment of the invention, however, a purging phase may be first required before the system is closed off finally for continuous operation because of the larger heat pipe 158 involved. The desired degree of exacuation of the heat pipe 158 can take a comparatively long time to achieve or require unduly large and sophisticated equipment. Thus, in the event that it is infeasible to achieve the proper or desired degree of evacuation in the heat pipe 158 but a reasonably good partial vacuum is obtained, purging of the remaining air in the heat pipe can be accomplished by loading it with working fluid and then operating it under normal conditions for a relatively short, predetermined, period of time with the loading valve adjusted to connect the heat pipe to a properly evacuated test collection tank instead of the metered volume supply tank. Such operation of the heat pipe 158 will sweep out the remaining air in it.

During regular operation of the heat pipe 158, the working fluid is vaporized by the heat flowing from the hot oil in the production casing 144 to the heat pipe. The vapor is represented by the broken line arrows 192 (FIG. 9) and passes up the annular space 156 into the vapor openings 176 and through tubes 160 and 162 to the heat exchangers 164 and 166. The vapor is condensed in the heat exchangers 164 and 166 and flows back down along the walls of the tubes 160 and 162, and largely directed by nozzles 174 out its liquid openings 178 against and into the wick 180 on the outer surface of the completion casing 142. The condensed vapor or liquid is represented by the solid line arrows 194. This liquid is returned through the wick 180 by gravity and capillary action to the hotter or evaporator regions of the heat pipe 158 and re-cycled. Of course, some of the liquid (condensate) will accumulate along and flow down the inner surface of the intermediate casing 140. This liquid is collected by the upper flanges 186 of brackets 182 and directed by its recesses 190 onto the strips 188 to the lower flanges 184 and into the wick 180 where it is effectively returned and evaporated at the evaporator regions of the heat pipe 158.

While certain exemplary embodiments of the invention have been described above and shown in the accompanying drawings, it is to be understood that such embodiments are merely illustrative of, and not restrictive on, the broad invention and that I do not desire to be limited in my invention to the details of construction or arrangement shown and described, for obvious modifications will occur to persons skilled in the art.

I claim.

1. A casing construction comprising:

an inner casing for normally conveying a relatively hot substance internally thereof, said inner casing being oriented generally at a predetermined angle from horizontal;

a heat gathering surface member positioned around, and spaced from, a predetermined length of said inner casing; and a closed passively actuated heat pipe including a relatively small predetermined amount of working liquid therein and thermally coupled conductively to at least a significant portion of the length of said heat gathering surface member, said heat pipe being oriented generally at a predetermined [and] *angle* from horizontal and operating passively to [tranport] *transport heat* from a heat input region to a heat output region thereof by vaporizing part of said working liquid at the heat input region causing a pressure increase which forces the vapor to flow to the cooler and lower pressure heat output region where it condenses and flows back to the heat input region for further transport of input heat whereby heat flowing from said hot substance and gathered by said heat gathering surface member can be transferred thereby to said heat input region and transported to said heat output region at a desired location.

2. The invention as defined in claim 1 further comprising an inner layer of insulating matter installed in the space between said inner casing and said heat gathering surface member and its longitudinally associated portion of said heat pipe.

3. The invention as defined in claim 2 further comprising an outer layer of insulating matter installed around, and adjacent to, said heat gathering surface member and the portion of said heat pipe thermally coupled directly thereto, said outer layer extending over the length of said heat gathering surface member.

4. The invention as defined in claim 3 further comprising a heat exchanger, and wherein said inner casing and said heat pipe are generally oriented vertically, and said heat pipe is closed at its lower operating end and adapted to be connected at its upper operating end to said heat exchanger which operatively closes said upper operating end.

5. The invention as defined in claim 4 further comprisinfi flow means for generally directing and distributing condensate flow back to said heat input region, said flow means being positioned against a predetermined length of the internal longitudinal surface of said inner wall of said annular cross section tube to spread and maintain the condensate flow thereover.

6. The invention as defined in claim 1 further comprising a heat exchanger, and wherein said heat pipe is closed at its lower operating end and adapted to be connected at its upper operating end to said heat exchanger which operatively closes said upper operating end.

7. The invention as defined in claim 6 further comprising wick means for generally directing and distributing condensate flow back to said heat input region, said wick means being positioned against a predetermined length and portion of the internal longitudinal wall surface of said heat pipe to spread and maintain the condensate flow thereover.

8. The invention as defined in claim 1 wherein said heat pipe is thermally coupled conductively to said heat gathering surface member along a substantial portion of its length.

9. The invention as defined in claim 1 further comprising wick means for generally directing and distributing condensate flow back to said heat input region, said wick means being positioned against a predetermined length and portion of the internal longitudinal wall surface of said heat pipe to spread and maintain the condensate flow thereover.

10. A casing construction comprising:

an inner casing for normally conveying a relatively hot substance internally thereof, said inner casing being oriented generally at a predetermined angle from horizontal; and a passively actuated heat pipe means including a tube of predetermined length and having an annular cross sectional configuration with inner and outer walls enclosing a space therebetween, and means for closing both ends of said annular cross sectional tube to retain a relatively small predetermined amount of working liquid therein, said annular cross sectional tube being positioned around and spaced from said inner casing, and said heat pipe means being oriented generally at a predetermined angle from horizontal and operating passively to transport heat from a heat input region to a heat output region thereof by vaporizing part of said working liquid at the heat input region causing a pressure increase which forces the vapor to flow to the cooler and lower pressure heat output region where it condenses and flows back to the heat input region for further transport of input heat whereby heat flowing from said hot substance is gathered by said annular cross sectional tube and transported by said heat pipe means to a desired location.

11. The invention as defined in claim 10 further comprising an inner layer of insulating matter installed in the space between said casing and said inner wall of said annular cross sectional tube, and wherein said casing and said heat pipe means are generally oriented vertically.

12. The invention as defined in claim [1] *11* further comprising a heat exchanger, and wherein said closing means includes a sealing element affixed to the lower operating end of said annular cross sectional tube and a coupling element affixed to the upper operating end thereof, said heat exchanger being adapted to be connected to said coupling element.

13. The invention as defined in claim 11 further comprising wick means for generally directing and distributing condensate flow back to said heat input region, said wick means being positioned against a predetermined length of the internal longitudinal surface of said inner wall of said annular cross section tube to spread and maintain the condensate flow thereover.

14. A casing construction comprising:

an inner casing for normally conveying a relatively hot substance therein;

a passively actuated heat pipe means including a tube of predetermined length and having an annular cross sectional configuration with inner and outer walls enclosing a space therebetween, and means for closing both ends of said annular cross sectional tube to retain a predetermined amount of working fluid therein, said annular cross sectional tube being positioned around and spaced from said inner casing and said heat pipe means operating to transport heat from a heat input region to a heat output region thereof whereby heat flowing from said hot substance is gathered by said annular cross sectional tube and transported by said heat pipe means to a desired location;

an inner layer of insulating matter installed in the space between said casing and said inner wall of said annular cross sectional tube; and an isotropic wick positioned against the internal longitudinal surface of said inner wall of said annular cross sectional tube.

15. The invention as defined in claim 14 further comprising liquid transfer means for transferring liquid flowing along the internal longitudinal surface of said outer wall to the internal longitudinal surface of said inner wall in said annular cross sectional tube.

16. The invention as defined in claim [9] *14* further comprising a plurality of heat exchangers and an outer layer of insulating matter installed adjacent to the external longitudinal surface of said outer wall of said annular cross sectional tube, and wherein said closing means includes a sealing element affixed to one end of said annular cross sectional tube and a manifold element affixed to the other end thereof, said heat exchangers being adapted to be connected to respective coupling means of said manifold element.

17. The invention as defined in claim [10] *15* wherein said inner casing and said heat pipe means are generally oriented vertically, and said liquid transfer means includes a plurality of vertically spaced liquid collection and transfer brackets, each of said brackets comprising a lower flange engaging said isotropic wick, an upper flange engaging said internal longitudinal surface of said outer wall, and an outwardly flaring strip connecting said lower flange to said upper flange whereby liquid collected by said upper flange is directed along said connecting strip to said isotropic wick.

18. A casing construction comprising:

an inner casing for normally conveying a relatively hot substance therein;

a passively actuated heat pipe means including a tube of predetermined length and having an annular cross sectional configuration with inner and outer walls enclosing a space therebetween, and means for closing both ends of said annular cross sectional tube to retain a predetermined amount of working fluid therein, said annular cross sectional tube being positioned around and spaced from said inner casing and said heat pipe means operating to transport heat from a heat input region to a heat output region thereof whereby heat flowing from said hot substance is gathered by said annular cross sectional tube and transported by said heat pipe means to a desired location;

an inner layer of insulating matter installed in the space between said casing and said inner wall of said annular cross sectional tube;

a heat exchanger, and said closing means including a sealing element affixed to one end of said annular cross sectional tube and a coupling element affixed to the other end thereof, said heat exchanger being adapted to be connected to said coupling element; and an isotropic wick positioned against the internal longitudinal surface of said inner wall of said annular cross sectional tube, and said inner casing and said heat pipe means being generally oriented vertically and said coupling element comprising a cover member affixed to the upper end of said annular cross sectional tube and a coupling tube generally mounted vertically in said cover member, said copling tube including a lower nozzle portion and an upper connection portion adapted to be connected to said heat exchanger, and said nozzle portion being oriented angularly away from vertical and having a lower liquid opening with its plane generally engaging said isotropic wick and an upper vapor opening with its plane generally oriented horizontally to receive vapor rising in said annular cross sectional tube for transport to said heat exchanger.

19. The invention as defined in claim [14 wherein said coupling element comprises a cover member affixed to the upper end of said annular cross sectional tube and a coupling tube generally mounted vertically in said cover member, said coupling tube including a lower nozzle portion and an upper connection portion adapted to be connected to said heat exchanger, and wherein said nozzle portion is oriented angularly away from vertical and has a lower liquid opening with its plane generally engaging said isotropic wick and an upper vapor opening with its plane generally oriented horizontally to receive vapor rising in said annular cross sectional tube for transport to said heat exchanger] *18 further comprising liquid transfer means for transferring liquid flowing along the internal longitudinal surface of said outer wall to the internal longitudinal surface of said inner wall in said annular cross sectional tube, said liquid transfer means including a plurality of vertically spaced liquid collection and transfer brackets, and each of said brackets comprising a lower flange engaging said isotropic wick, an upper flange engaging said internal longitudinal surface of said outer wall and an outwardly flaring strip connecting said lower flange to said upper flange whereby liquid collected by said upper flange is directed along said connecting strip to said istropic wick.*

20. The invention as defined in claim [16] *19* wherein each of said brackets is attached by its lower flange to said isotropic wick, and its upper flange is spring-loaded by said connecting strip thereof against said internal longitudinal surface of said outer wall, said upper flange including a plurality of arcuate recesses provided therein to direct flow of said liquid towards said connecting strip thereof.

21. A casing construction comprising:

an inner casing for normally conveying a relatively hot substance internally thereof, said inner casing being oriented generally at a predetermined angle from horizontal;

a heat gathering surface member positioned around, and spaced from, a predetermined length of said inner casing;

a closed passively actuated heat pipe including a relatively small predetermined amount of working liquid therein and thermally coupled conductively to at least a significant portion of the length of said heat gathering surface member, said heat pipe being oriented generally at a predetermined angle from horizontal and operating passively to transport heat from a heat input region to a heat output region thereof by vaporizing part of said working liquid at the heat input region causing a pressure increase which forces the vapor to flow to the cooler and lower pressure heat output region where it condenses and flows back to the heat input region for further transport of input heat whereby heat flowing from said hot substance and gathered by said heat gathering surface member can be transferred thereby to said heat input region and transported to said heat output region at a desired location; and wick means including a wire structure fabricated of relatively small diameter wire for generally directing and distributing condensate flow back to said heat input region, said wick means being positioned against a predetermined length and portion of the internal longitudinal wall surface of said heat pipe to spread and maintain the condensate flow thereover.

22. A casing construction comprising:

an inner casing for normally conveying a relatively hot substance internally thereof, said inner case being oriented generally at a predetermined angle from horizontal;

a heat gathering surface member positioned around, and spaced from, a predetermined length of said inner casing;

a closed passively actuated heat pipe including a relatively small predetermined amount of working liquid therein and thermally coupled conductively to at least a significant portion of the length of said heat gathering surface member, said heat pipe being oriented generally at a predetermined angle from horizontal and operating passively to transport heat from a heat input region to a heat output region thereof by vaporizing part of said working liquid at the heat input region causing a pressure increase which forces the vapor to flow to the cooler and lower pressure heat output region where it condenses and flows back to the heat input region for further transport of input heat whereby heat flowing from said hot substance and gathered by said heat gathering surface member can be transferred thereby to said heat input region and transported to said heat output region at a desired location;

wick means including an extended wire structure fabricated of relatively small diameter wire for generally directing and distributing condensate flow back to said heat input region, said wick means being positioned against a predetermined length and portion of the internal longitudinal wall surface of said heat pipe to spread and maintain the condensate flow thereover; and a heat exchanger, and wherein said heat pipe is closed at its lower operating end and adapted to be connected at its upper operating end to said heat exchanger which operatively closes said upper operating end.

23. A casing construction comprising:

an inner casing for normally conveying a relatively hot substance internally thereof, said inner casing being oriented generally at a predetermined angle from horizontal;

a passively actuated heat pipe means including a tube of predetermined length and having an annular cross sectional configuration with inner and outer walls enclosing a space therebetween, and means for closing both ends of said annular cross sectional tube to retain a relatively small predetermined amount of working liquid therein, said annular cross sectional tube being positioned around and spaced from said inner casing, and said heat pipe means being oriented generally at a predetermined angle from horizontal and operating passively to transport heat from a heat input region to a heat output region thereof by vaporizing part of said working liquid at the heat input region causing a pressure increase which forces the vapor to flow to the cooler and lower pressure heat output region where it condenses and flows back to the heat input region for further transport of input heat whereby heat flowing from said hot substance is gathered by said annular cross sectional tube and transported by said heat pipe means to a desired location;

an inner layer of insulating matter installed in the space between said casing and said inner wall of said annular cross sectional tube, and wherein said casing and said heat pipe means are generally oriented vertically; and wick means including a wire structure fabricated of relatively small diameter wire for generally directing and distributing condensate flow back to said heat input region, said wick means being positioned against a predetermined length of the internal longitudinal surface of said inner wall of said annular cross section tube to spread and maintain the condensate flow thereover.

24. A casing construction comprising:

an inner casing for normally conveying a relatively hot substance internally thereof, said inner casing being oriented generally at a predetermined angle from horizontal;

a heat gathering surface member positioned around, and spaced from, a predetermined length of said inner casing;

a closed passively actuated heat pipe including a relatively small predetermined amount of working liquid therein and thermally coupled conductively to at least a significant portion of the length of said heat gathering surface member, said heat pipe being oriented generally at a predetermined angle from horizontal and operating passively to transport heat from a heat input region to a heat output region thereof by vaporizing part of said working liquid at the heat input region causing a pressure increase which forces the vapor to flow to the cooler and lower pressure heat output region where it condenses and flows back to the heat input region for further transport of input heat whereby heat flowing from said hot substance and gathered by said heat gathering surface member can be transferred thereby to said heat input region and transported to said heat output region at a desired location;

flow means including an extended wire structure fabricated of relatively small diameter wire for generally directing and distributing condensate flow back to said heat input region, said flow means being positioned against a predetermined length of the internal lognitudinal surface of said inner wall of said annular cross section tube to spread and maintain the condensate flow thereover;

an inner layer of insulating matter installed in the space between said inner casing and said heat gathering surface member and its longitudinally associated portion of said heat pipe;

an outer layer of insulating matter installed around, and adjacent to, said heat gathering surface member and the portion of said heat pipe thermally coupled directly thereto, said outer layer extending over the length of said heat gathering surface member; and a heat exchanger, and wherein said inner casing and said heat pipe are generally oriented vertically, and said heat pipe is closed at its lower operating end and adapted to be connected at its upper operating end to said heat exchanger which operatively closes said upper operating end.

25. The invention as defined in claim 23 further comprising liquid transfer means for transferring liquid flowing down the internal longitudinal surface of said outer wall to the internal longitudinal surface of said inner wall in said annular cross sectional tube.

References Cited

The following references, cited by the Examiner, are of record in the patented file of this patent or the original patent.

UNITED STATES PATENTS

| | | | |
|---|---|---|---|
| 3,493,2/1970 | | Bromberg | 165—105 UX |
| 3,561,531 | 2/1971 | Miller | 166—Dig. 1 |
| 3,564,862 | 2/1971 | Hashemi et al. | 61—36 A X |
| 3,662,832 | 5/1972 | Keeler et al. | 166—302 |
| 3,456,735 | 7/1969 | McDougall et al. | 166—57 UX |
| 3,613,792 | 10/1971 | Hyde et al. | 166—315 |
| 3,332,476 | 7/1967 | McDougal | 165—105 X |
| 3,472,314 | 10/1969 | Balch | 165—105 X |
| 3,229,759 | 1/1966 | Grover | 165—105 |
| 50,399 | 10/1865 | Somes | 166—57 |
| 1,812,267 | 6/1931 | Lewis | 166—302 UX |
| 2,529,915 | 11/1950 | Chausson | 165—105 UX |
| 3,142,336 | 7/1964 | Doscher | 166—57 X |
| 3,217,791 | 11/1965 | Long | 166—DIG. 1 |

OTHER REFERENCES

The Oil & Gas Journal, "Gypsum Blend Cements Show Promise for North Slope Use," May 19, 1969, p. 58.

World Oil, "Alaskan Completions Will be Complicated," January 1970, p. 85.

STEPHEN J. NOVOSAD, Primary Examiner

U.S. Cl. X.R.

165—45, 105; 166—DIG. 1, 302